Patented Aug. 10, 1937

2,089,212

UNITED STATES PATENT OFFICE 2,089,212

HYDROTROPIC FATTY MATERIAL AND METHOD OF MAKING SAME

Wolf Kritchevsky, Chicago, Ill.

No Drawing. Application June 8, 1936,
Serial No. 84,230

22 Claims. (Cl. 260—124)

My invention relates to a new class of hydrotropic fatty substances and method of producing the same.

It is known that a number of useful compounds can be prepared by condensing higher fatty acids with alkylol amines in which the ratio of fatty acid to the alkylol amine is one or more. Such compounds have been made before, and in each case there is at least one mol. of higher fatty acid for each mol. of alkylol amine. There may be more, but in no case has this class of compound been made, prior to my invention, wherein the molal ratio of alkylol amine to higher fatty acid is more than one. Compounds of the character mentioned have a number of useful properties.

The principal object of my present invention is to form new and improved chemical substances of the general character outlined below.

Another object is to form condensation products of monobasic carboxylic acids such as fatty acids, particularly higher fatty acids, and alkylol amines, which will have effective properties in either acid or alkali media.

Another object is to produce a series of hydrophillic fats or water dispersible fats of the class sometimes referred to as hydrotropic fats.

I have discovered that if one mol. of a monobasic carboxylic acid such as the fatty acids, particularly the higher fatty acids, is condensed with more than one mol. of alkylol amine, such as two mols or more, a condensation product is obtained which is readily dispersible in water and which possesses many useful properties in either neutral, alkali or acid media. The resulting substances are dispersible and will retain their effectiveness in the presence of calcium and/or magnesium salts.

In forming my improved substances, while the condensation may take place at temperatures slightly below 100° C., for appreciable results the temperature should preferably be above 100° C. Condensations have been successfully carried out as high as 250° C. It may be stated that the temperature range should be high enough to obtain appreciable speed of reaction but should not be high enough to cause decomposition of the resulting product. I have found that for practical purposes, the best temperatures are between about 135° C. and 210° C. for most of the substances coming within the class of my invention. The time required for reaction may be as long as twenty hours or more at the lowest temperatures and as short as fifteen minutes at the higher temperatures.

Condensations may be made in neutral solutions or with the aid of condensing agents of either alkaline or acid character. The nature of the condensing agent has an effect upon the speed of reaction and temperature required. Although I have used several different condensing agents for experimental purposes, I have found that excellent products are obtained without the use of any condensing agents.

Compounds or substances are obtained having a variety of properties depending, among other things, upon the character of the monobasic carboxylic acid or the like and alkylolamine employed. Substances having good technical properties may be prepared by the use of lower molecular weight aliphatic monocarboxylic acids such as the lower fatty acids including acetic acid, propionic acid, butyric acid, and other similar acids having up to six carbon atoms in the molecule. For my most effective results, however, I prefer to use the aliphatic monocarboxylic acids, such as the fatty acids, having at least six carbon atoms, and, more particularly, those containing from twelve to eighteen carbon atoms. The condensation products prepared by the use of these latter mentioned acids, or higher molecular weight acids, are clearly differentiated in at least many of their properties and uses from the products prepared from the lower molecular weight aliphatic monocarboxylic acids. It will be understood that wherever I use the term "higher molecular weight aliphatic monocarboxylic acid" or the term "higher fatty acid", I intend to cover such acids having a chain of at least six carbon atoms. Aside from the acids mentioned above, the most preferred of which are derived from the naturally occurring animal and vegetable triglyceride oils and fats, hydrogenated or not, I may employ fatty acids, derived from waxes, having as high as thirty-five carbon atoms or more. Examples of suitable fatty acids are stearic acid, palmitic acid, oleic acid, linoleic acid, lauric acid, myristic acid, coconut oil fatty acids, ricinoleic acid, hexanoic acid, butanoic acid, and others such as the wax fatty acids.

The invention is not limited to the use of the fatty acids but other monobasic acids can also be used including aromatic acids such as benzoic acid, naphthoic acid, and hydroaromatic acids like abietic acid. I may use cyclic acids, of the type of naphthenic acid, and heterocyclic acids like quinaldine carboxylic acid.

Derivatives of any of the acids mentioned above may also be employed such as sulphonic acid, halogen, and nitro derivatives.

It is not necessary to secure adequate results to use the free fatty acids, but I can also use fats as a source of fatty acid, in which case glycerine or other alcohol forming the fatty ester splits off during the condensation. In place of the fats, I may also use sulphuric acid esters of fats, like sulphonated castor oil, as well as the substitution products thereof such as the halogenous substitution products, for example, chlorinated olein. I may also use the acid halides, such as stearyl chloride, but in this latter case, lower temperatures must be used for the condensation. I may also use amides of fatty acids, and their alkylol derivatives. As a source of fatty acids, I may also employ acid anhydrides. In general, any organic acid derivative containing a —CO— group may be used. It is obvious to the skilled chemist that when employing ordinary glyceride esters as a source of fatty acid, the number of equivalents of fatty acid must be taken into consideration so that not substantially more than one mol. of fatty acid is present for two mols or more of the alkylolamine.

I employ the term "alkylol" in describing the invention in a general sense to include substances like monoethanolamine, diethanolamine, triethanolamine, dialkylalkylolamines, diethylethanolamine, or monoethylalkylolamine, butanolamine, pentanolamine, hexanolamine, cyclohexylethanolamine, isobutanolamine, N-phenyl ethanolamine, laurylolamine, triethanolammoniumhydroxide, also the alkylolamines of glycerine, sugar and other mono- and polyvalent alcohols, and aryl and cycloalkyl alkylolamines.

After considerable investigation, I have found it impossible up to the present time to determine the exact nature of the condensation products which I obtain. While the mechanism of the reactions which take place is exceedingly complex, present indications point to the probability that a pentavalent nitrogen is formed, one molecule of water splitting off to form the ester or the amide and the other molecule or molecules of water which may form add on to the nitrogen of the amine or amines to form a pentavalent nitrogen. This can be illustrated by means of the following formulae:

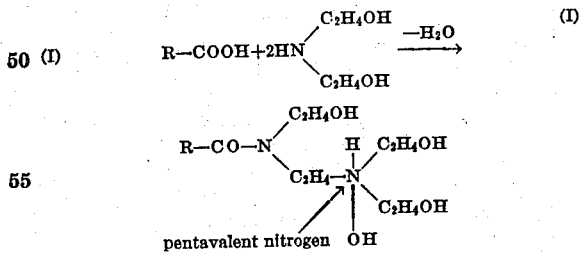

As was stated, more than one molecule of water can be split out, always, however, apparently maintaining the pentavalency of the amine nitrogen. Thus, illustrating the reaction where two molecules of water split out, the resulting product, utilizing the same reacting constituents as described in (I), might be as follows:

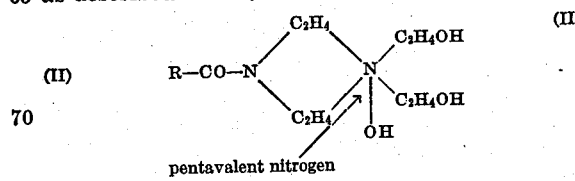

The reaction can also be directed to split out three molecules of water by modifying the temperature and time of treatment, the resulting product being probably as follows:

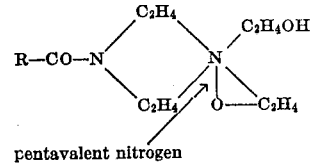

pentavalent nitrogen

Although the compounds formulated above are of the amide type, it is apparent that esters may also be formed through the reaction of the carboxylic group of the fatty acid and one of the hydroxyl groups of the alkylolamines. It is believed that this is evident without the showing of additional formulae. However, in the case of esters, too, the amine nitrogen appears to be pentavalent. Under certain conditions, quaternary ammonium bases may be formed. For instance, when a fatty acid of the formula R—COOH is condensed with two molecules of triethanolamine, the compounds of the following probable formulae result:

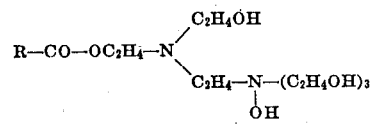

Analogous compounds may be formed with one molecule of acid, one molecule of monoethanolamine and one molecule of triethanolamine having the following probable formulae:

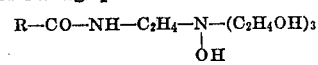

In each of the examples, it will be noted that the nitrogen is apparently pentavalent and retains its pentavalency throughout the reactions involving the splitting out of water. As has been stated, it is my present view that the mechanism of the reactions as indicated hereinabove represents possibly the most reasonable explanation of what occurs in the process. I do not, however, wish to be bound by these statements since further research may more definitely fix the nature of the reaction products of my invention. For the reasons given, I do not limit my invention to compounds having a specific formula, but rather to a process for producing improved hydrotropic fats and to the products resulting from such process.

It is not necessary to have the same alkylolamine in the reaction but two or more varied amines can be used. For instance, one molecule of a fatty acid can be condensed with three molecules of alkylolamines; one, for example, being a mono-alkylolamine, one a di- and one a tri-alkylolamine. Similarly, a mixture of higher fatty acids or similar organic acids can be employed in place of a single acid. Thus, for example, one may condense a mixture of stearic and oleic acids with diethanolamine, the mean molecular weight of these acids being determined so that the molal ratio of the diethanolamine to the higher fatty acid mixture is not substantially less than two to one.

The condensation may advantageously be carried out in either one or a plurality of stages. In the first method, the fatty acid or similar material is mixed with the alkylolamine and condensed at the proper temperature and for the proper length of time. In the second method, one mol. of alkylolamine may be first condensed with a fatty acid or similar material and the resulting product then condensed with an additional mol. or more of alkylolamine and so on.

It will be appreciated that I do not necessarily limit my invention to products resulting from the condensation of a mixture of alkylolamines and higher fatty acid the molal ratio of the former to the latter being at least two to one. I also include within the scope of my invention reaction or condensation products which contain substantial proportions of condensation products of alkylolamines and higher fatty acids or the like in which the molal ratio of the alkylolamine to higher fatty acid is at least two to one. Thus, for example, I may condense a mixture of an alkylolamine and a higher fatty acid wherein the molal ratio of the alkylolamine to the higher fatty acid is say 1.5 or 1.8 to 1, in which case such products contain a substantial proportion of products corresponding to the condensation product of a mixture of an alkylolamine and a higher fatty acid whose molal ratio is two to one. As illustrative of such practice, I may condense two mols of a higher fatty acid or the like with three mols of an alkylolamine.

When a crude mixture of alkylolamines is used, mixtures of condensation products of the various types are obtained. In any usual process, when the alkylolamines are synthesized, a mixture is formed which contains mono-, di-, and tri-alkylolamines. This mixture can be directly condensed with the fatty acids to form products as described in my invention, thus avoiding the necessity of expensive purifying processes.

For the benefit of those skilled in the art, I give hereinafter a number of representative examples which are by no means exhaustive, but are sufficient to teach those skilled in the art the manner in which my invention may be practiced.

Example 1

One mol. of coconut oil fatty acids is mixed with two mols of monoethanolamine and heated two to four hours at a temperature of between 150 and 175° C. A solid waxy substance is obtained that is easily soluble in organic solvents and is dispersible in aqueous media.

Example 2

One mol. of oleic acid is condensed with 3 mols of triethanolamine, the procedure being the same as in the first example. An oily product is obtained having good dispersibility-in-water properties and other valuable characteristics.

Example 3

One mol. of coconut oil fatty acids is condensed with two mols of diethanolamine at a temperature of 170° to 200° C. for a few hours. The resulting product is soluble in water and has good technical properties as an emulsifying agent.

Example 4

One mol. of coconut oil fatty acids and two mols of diethanolamine are condensed for three hours at a temperature of 145 to 165° C. An oil-like substance is obtained which is perfectly soluble in water and is an excellent emulsifying agent.

Example 5

One mol. of oleic acid and two mols of diethanolamine are condensed at a temperature of between 160 and 180° C. for three to four hours. An oily product is obtained having excellent emulsifying properties.

Example 6

One mol. of stearic acid is condensed with two mols of glycerol amine for about four hours at approximately 180 to 190° C. The resulting product has generally the same desirable kind of characteristics as the products produced in the above examples.

Example 7

One mol. of stearic acid is condensed with two mols of diethanolamine at a temperature of 190 to 210° C. for three hours. A wax results that disperses in water.

Example 8

One mol. of abietic acid is condensed with three mols of diethanolamine at about 210 to 220° C. for about three hours. The resulting product is a thick oily substance of good solvent and emulsifying properties.

Example 9

One mol. of stearic acid is condensed with two mols of monoethanolamine at about 200° C. for about three hours. A solid wax results, a small proportion of which will solidify kerosene.

Example 10

One mol. of sulphonated castor oil is condensed with one mol. of diethanolamine and one mol. of triethanolamine at about 160 to 170° C. for about two to three hours. The condensation product has excellent emulsifying and solvent properties.

Example 11

One mol. of coconut fatty acids is condensed with three mols of cyclohexylethanolamine, employing a temperature of about 165° C. for about two to three hours. An oily liquid is obtained having very good technical properties as an emulsifying agent.

Example 12

One mol. of coconut oil fatty acids is mixed with two mols of triethanolamine and the mixture condensed at a temperature of 150° to 170° C. for about three hours. The resulting product is an oily liquid soluble in water.

Example 13

One mol. of coconut oil fatty acids is condensed with two mols of a mixture of ethanolamines representing the crude mixture obtained in the process of the manufacture of this product. The crude mixture is composed of mono-, di- and tri-ethanolamines.

The temperature of the condensation may be 160 to 170° C. for two to three hours. The resulting oily product has valuable emulsifying properties.

Example 14

One mol. of ricinoleic acid is condensed with two mols of diethanolamine for two to three hours at a temperature of 210° C. An oily product results which has excellent hydrotropic properties.

Example 15

One mol. of abietic acid is condensed with two molecules of diethanolamine at a temperature between 170 and 210° C. for two to three hours. A water-soluble rosin results.

Example 16

One mol. of linoleic acid is condensed with two mols of diethanolamine at 150 to 160° C. for about three hours. A water-dispersible product results which may be oxidized in air in the same general manner as in the case of linseed oil.

Example 17

One mol. of butyric acid is condensed with two molecules of diethanolamine at 150 to 180° C. for about three hours, the resulting product being very hydrophillic.

Example 18

Two mols of coconut oil fatty acids are condensed with three mols of diethanolamine for three hours at 150 to 180° C. The resulting compound has good emulsifying properties

Example 19

One mol. of stearic acid is condensed with one mol. of monoethanolamine and one mol. of triethanolamine at a temperature of approximately 160° C. and for about three hours. The resulting compound has good emulsifying properties.

Example 20

One mol. of coconut oil fatty acids is condensed with one mol. of monoethanolamine and one mol. of triethanolamine at a temperature of 180 to 200° C. for about three hours. An oily liquid results having good water-imbibing characteristics.

In the above examples, I have tried to give a general practical idea of how the invention is practiced. I do not wish to be limited either by the examples or by other details. The examples merely illustrate the general principle that if one mol. of a fatty acid or similar material, as previously described, is condensed with not substantially less than two or more mols of alkylol amine, products of unusal solubility, emulsifying and solvent properties are obtained that have many valuable technical applications.

From the above examples, it is clear that I may use various alkylol amines and various monobasic acids, particularly fatty acids or sources of fatty acids, and in each case a technically valuable product of the character desired is obtained. I may use, as in the case of Example 13, a mixture of alkylol amines and still a valuable final product is obtained. When a mixture of alkylol amines is used, the number of possible final products produced is greatly increased and in such a case it is quite probable that a mixture of compounds is obtained. Possibly some of the properties of my new hydrophillic or hydrotropic fats are due to the fact that a mixture is formed. When some sources of fatty acid are used, such as coconut oil fatty acids, for example, a mixture also results, but in this case, one product differs from the other in the character of the R group rather than in the number, kind, and/or distribution of alkylol amine groups.

Valuable products can also be prepared by introducing oxygenated sulphur or phosphorous groups into the molecule of my compounds. This may be accomplished by sulphating or phosphating my compounds in accordance with known practice, employing sulphuric acid, oleum, chlorsulphonic acid, phosphoric acid, $P_2O_5$, etc. Numerous examples might be given to the manner in which the substances of my invention function in an improved way as emulsifying agents and in other ways. For making a comparison, I shall consider the compound formed by condensing one mol. of a higher fatty acid with only one mol. of alkylol amine as contrasted with various of the products given in the list of illustrative examples. If the former product is added to a mixture of oil and water, it has very little effect in emulsifying the oil and water mixture. If an emulsion is formed by vigorous agitation, it will separate in a comparatively short time and the oil will float to the top, even when hot. If, on the contrary, one of the products of my present invention is added to a mixture of oil and water, an emulsion is very quickly formed which will remain stable in some cases almost indefinitely. So marked is the emulsifying action that in some cases the oil becomes finely divided so as to appear to be almost colloidally dispersed in the water.

For the reasons noted above, I term the products of this reaction hydrotropic fats, as such fats are not only soluble or readily dispersible in water, but a water solution thereof will dissolve or perfectly disperse water-insoluble substances like fatty acids, gums and resins, both natural and synthetic. Such solutions will also disperse inorganic and organic pigments, vat dyes, etc.

Many of these substances dissolve readily also in alcohol and various organic solvents. Indeed, in some cases, they exhibit a hydrotropic action when dissolved in such media.

The compounds which can be made in accordance with my invention have a number of uses, all of which need not be mentioned here. However, I shall indicate a number of illustrative uses for the convenience of those skilled in the art.

My products will emulsify water insoluble pigments with or without gums to form a dispersion which is almost a solution. The products can be used in and will improve the action of paints, printing inks, etc. These products form excellent scouring preparations for wool. They may be used as emulsifying agents in water-oil emulsions, such as margarine. In the latter case, they keep the emulsion from leaking and will prevent spattering during frying.

Vat dyes can be reduced with hydrosulphite and the hydrotropic fats without the presence of alkali and therefore can be used on wool, furs, etc., whereas otherwise their use is limited.

In an earlier part of the specification, I refer to temperatures at which the reaction is carried on by stating that temperatures even below 100° C. could be employed but that a temperature high enough to cause decomposition of the final product should not be used. For practical purposes, as I have already stated, any temperature between 130 and 210° C. can be used and the resulting product will have the valuable properties discussed. While the difference in temperature employed is mainly one of speed of the reaction, some slight variations in the product may be noted if wide variations of temperature are used. The temperature employed may be modified by the use of different pressure conditions. For example, if the condensation is carried out in a vacuum, much lower temperatures in many cases can be employed, and/or the heating time decreased.

While, in the various examples set forth above, I have mentioned the time involved in carrying out the condensation reaction, it will be appreciated that such may be varied depending upon the size of the batch of material treated and upon other factors. These matters, however, are readily understood by those skilled in the art. In general, the larger the batch of material being reacted, the longer time will be required to complete the reaction.

As I have stated above, my preferred results are obtained by the use of the higher fatty acids, and more particularly those having between twelve and eighteen carbon atoms in the chain. The invention, however, is not to be limited except as indicated in the claims.

It is to be understood that whenever the term "fatty acid" is employed, it is intended to include those acids which are commonly understood to come within the definition of the quoted term but in no case is it intended to include those acids of the acrylic series wherein there is a double bond in the $\alpha$-$\beta$ position to the carboxylic group.

Wherever the term "source of higher fatty acid radicals" is employed, it will be understood to cover any derivative of a higher fatty acid containing an acyl group and which readily yields the acyl group under the conditions of the reaction, such as triglyceride fats, sulphuric acid esters of fats, substitution products of fats such as chlorinated olein, acid halides, acid amides, acid anhydrides, and the like.

Wherever the term "condensation product" is employed, it will be understood to cover a reaction product between the acid and the alkylolamine wherein water or acid or the like is split out as a result of the union of the molecules of acid and alkylolamine. Similarly, the term "condensing" is employed to cover a process wherein water or acid or the like is split out as a result of the union of the molecules of acid and alkylolamine.

This application is a continuation-in-part of my prior application, Serial No. 738,688, filed August 6, 1934.

What I claim as new and desire to protect by Letters Patent of the United States is:

1. A process for producing a hydrotropic fatty material which comprises mixing together alkylolamine and a higher fatty acid, in a ratio of at least two mols of alkylol amine to one mol. of higher fatty acid, and heating the mixture at a temperature above 100° C. and below the temperature of decomposition of the resulting hydrotropic fatty material.

2. A process for producing a hydrotropic fatty material which comprises mixing together alkylolamine and fatty acid, the predominant portion of which contains between twelve and eighteen carbon atoms, the molal ratio of alkylolamine to fatty acid being not substantially less than two to one, and heating the mixture to produce a reaction product wherein at least one molecule of water is split off for each molecule of final fatty material produced.

3. The condensation product of one molecule of an aliphatic monocarboxylic acid and at least two molecules of alkylolamine, said acid containing at least twelve carbon atoms.

4. The condensation product of one molecule of a higher fatty acid and two molecules of alkylolamine.

5. The condensation product produced by reacting one mol. of a higher fatty acid with at least two mols of alkylolamine at a temperature between 100 and 300° C.

6. The condensation product of one mol. of coconut oil fatty acids and at least two mols of alkylolamine.

7. The condensation product of one mol. of coconut oil fatty acids and at least two mols of diethanolamine.

8. The condensation product of one mol. of stearic acid and at least two mols of alkylolamine.

9. The condensation product of one mol. of stearic acid and two mols of diethanolamine.

10. The condensation product of at least two mols of alkylolamine and one mol. of fatty acids of the group consisting of stearic, oleic, lauric, myristic, linoleic, palmitic, ricinoleic, coconut oil fatty acids, and mixtures thereof.

11. The condensation product of a mixture of alkylolamine and a source of higher fatty acid radicals, the molal ratio of the alkylolamine to the higher fatty acid radicals being at least two to one.

12. The condensation product of a higher fatty acid and alkylolamine, the molal ratio of alkylolamine to the higher fatty acid being not less than two to one.

13. The condensation product of one mol. of oleic acid and two mols of a diethanolamine.

14. The condensation product of a higher fatty acid and alkylolamine, the molal ratio of alkylolamine to the higher fatty acid being not substantially less than two to one.

15. The condensation product of alkylolamine and a higher fatty acid, said product containing a substantial proportion of a condensation product of said alkylolamine and higher fatty acid in which the molal ratio of the alkylolamine to higher fatty acid is at least two to one.

16. A process for producing hydrotropic fatty materials which comprises mixing together alkylolamine with higher fatty acid, the molal ratio of the alkylolamine to the higher fatty acid being not substantially less than two to one, and heating the mixture at a temperature of about 100° C. or higher but below the temperature of decomposition of the resulting hydrotropic fatty material to effect a condensation between the alkylolamine and higher fatty acid.

17. The process of claim 16 wherein the higher fatty acid is a member of the class consisting of stearic, oleic, lauric, myristic, linoleic, palmitic, ricinoleic, coconut oil fatty acids, and mixtures thereof.

18. A process for producing hydrotropic material which comprises mixing together alkylolamine with aliphatic mono-carboxylic acid containing at least twelve carbon atoms, the molal ratio of the alkylolamine to the organic carboxylic acid being not substantially less than two to one, and heating the mixture at a temperature of about 100° C. or higher but below the temperature of decomposition of the resulting hydrotropic material to effect a condensation between the alkylolamine and organic carboxylic acid.

19. The condensation product of aliphatic mono-carboxylic acid containing at least twelve carbon atoms and alkylolamine, the molal ratio of the alkylolamine to the carboxylic acid being not substantially less than two to one.

20. The condensation product of alkylolamine and aliphatic mono-carboxylic acid containing at least twelve carbon atoms, said product containing a substantial proportion of a condensation product of said alkylolamine and higher monobasic carboxylic acid in which the molal ratio of the alkylolamine to the higher monobasic carboxylic acid is at least two to one.

21. The condensation product of alkylolamine and a member of the group consisting of higher fatty acids, their triglycerides, esters, amides, anhydrides, and halides, there being present in said condensation product not substantially less than two mols of alkylolamine for each mol. of higher fatty acid.

22. A process for producing a hydrotropic fatty material which comprises mixing together alkylolamine and a member of the group consisting of higher fatty acids, their triglycerides, esters, amides, anhydrides, and halides in a ratio of not substantially less than two mols of alkylolamine for each mol. of higher fatty acid, and condensing the mixture at a temperature below the temperature of decomposition of the resulting hydrotropic fatty material.

WOLF KRITCHEVSKY.